(12) United States Patent
Lee et al.

(10) Patent No.: US 11,802,849 B2
(45) Date of Patent: Oct. 31, 2023

(54) PHOTOIONIZATION GAS SENSOR

(71) Applicant: KOREA ELECTRONICS TECHNOLOGY INSTITUTE, Seongnam-si (KR)

(72) Inventors: Dae Sung Lee, Yongin-si (KR); Kwang Bum Park, Seongnam-si (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 0 days.

(21) Appl. No.: 17/709,567

(22) Filed: Mar. 31, 2022

(65) Prior Publication Data
US 2023/0176011 A1 Jun. 8, 2023

(30) Foreign Application Priority Data

Nov. 22, 2021 (KR) ........................ 10-2021-0161665

(51) Int. Cl.
*G01N 27/66* (2006.01)
(52) U.S. Cl.
CPC .................................. *G01N 27/66* (2013.01)
(58) Field of Classification Search
CPC ....................................................... G01N 27/66
USPC ......................................................... 324/464
See application file for complete search history.

(56) References Cited

U.S. PATENT DOCUMENTS

| | | | | |
|---|---|---|---|---|
| 6,646,444 B2* | 11/2003 | Dolgov | ................. | G01N 27/66 250/382 |
| 6,686,876 B1* | 2/2004 | Patel | ...................... | H01J 17/30 333/99 PL |
| 7,180,076 B2* | 2/2007 | Haverstick | ............. | G01N 27/66 250/382 |
| 8,362,445 B2* | 1/2013 | Short | .................... | H01J 49/147 250/281 |
| 2005/0006651 A1* | 1/2005 | LeBoeuf | ............... | H01L 33/502 257/79 |
| 2011/0109226 A1* | 5/2011 | Cooley | .................. | H05G 2/003 315/111.21 |
| 2016/0276144 A1* | 9/2016 | Chaudhary | ......... | H01J 49/0013 |

FOREIGN PATENT DOCUMENTS

| | | | | |
|---|---|---|---|---|
| WO | WO-9908102 A1 * | 2/1999 | ............. | G01N 27/66 |
| WO | WO-2016141470 A1 * | 9/2016 | ............. | G01N 27/66 |

OTHER PUBLICATIONS

Bao, Xiue, et al. "Integration of interdigitated electrodes in split-ring resonator for detecting liquid mixtures." IEEE Transactions on Microwave Theory and Techniques 68.6 (2020): 2080-2089. (Year: 2020).*

* cited by examiner

*Primary Examiner* — Christopher P McAndrew
(74) *Attorney, Agent, or Firm* — Hauptman Ham, LLP

(57) ABSTRACT

Disclosed is a photoionization gas sensor including an ultraviolet generating module having a first substrate, a second substrate, and a third substrate sequentially coupled in a vertical direction, and configured to generate ultraviolet by applying an electric field to a noble gas filling a first cavity, the first cavity formed in a central portion of the second substrate, and a measuring module configured to collect an electrical signal, the electrical signal being generated such that an electric field is applied to a passage, through which gas ionized by ultraviolet passes, so as to allow the ionized gas to come into contact with an electrode, thereby having a small volume and being operated at a low voltage.

7 Claims, 8 Drawing Sheets

PHOTOIONIZATION GAS SENSOR

CROSS REFERENCE TO RELATED APPLICATION

The present application claims priority to Korean Patent Application No. 10-2021-0161665, filed Nov. 22, 2021, the entire contents of which is incorporated herein for all purposes by this reference.

BACKGROUND OF THE INVENTION

Field of the Invention

The present invention relates to a photoionization gas sensor.

Description of the Related Art

Volatile organic compounds may be easily volatilized into the atmosphere. Volatile organic compounds may be toxic to a human body. In order to detect volatile organic compounds, a photoionization detector may be used. The photoionization detector may detect volatile organic compounds by the concentration thereof, which may be detected by irradiating a gas such as a volatile organic compound with ultraviolet rays, having an energy greater than or equal to an ionization energy, so as to ionize the gas, and then measuring an electrical signal generated while ions of the gas divided into positive ions and negative ions move to electrodes. Here, ultraviolet is generated using an ultraviolet light source having a structure in which an electric field is applied to a cylindrical tube filled with a noble gas.

RELATED ART DOCUMENT

[Patent Document]
(Patent Document 1) U.S. Pat. No. 6,646,444 B2

SUMMARY OF THE INVENTION

It is an object of the present invention to provide a photoionization gas sensor having a small volume and operated at a low voltage.

In accordance with an aspect of the present invention, the above and other objects can be accomplished by the provision of a photoionization gas sensor including an ultraviolet generating module having a first substrate, a second substrate, and a third substrate sequentially coupled in a vertical direction, and configured to generate ultraviolet by applying an electric field to a noble gas filling a first cavity, the first cavity formed in a central portion of the second substrate, and a measuring module configured to collect an electrical signal, the electrical signal being generated such that an electric field is applied to a passage, through which gas ionized by ultraviolet passes, so as to allow the ionized gas to come into contact with an electrode.

The ultraviolet generating module may include the first substrate having a first electrode formed on an upper surface thereof, the third substrate having a second electrode formed on a lower surface thereof, and the second substrate coupled between the first substrate and the third substrate and having formed therein the first cavity vertically penetrating a central portion thereof. The first cavity may be filled with a noble gas, and the first electrode may form a first hole in a central portion thereof and the second electrode may be formed in a plate shape so as to radiate ultraviolet, which is generated by a reaction of the noble gas in the first cavity with the electric field, upwardly of the first electrode through the first hole.

The measuring module may include a support substrate spaced apart from the upper surface of the first substrate by a spacer and having a through hole vertically penetrating therethrough so as to allow the gas ionized by ultraviolet to pass therethrough, a third electrode formed on a lower surface of the support substrate and formed with a second hole corresponding to the through hole, and a fourth electrode formed on an upper surface of the support substrate and formed with a third hole corresponding to the through hole. The gas ionized by ultraviolet may contact the third electrode or the fourth electrode due to the electric field formed by applying a voltage to the third electrode and the fourth electrode so as to generate an electrical signal.

The ultraviolet generating module may include the first substrate, the third substrate having a first electrode and a second electrode spaced apart from each other on an upper surface thereof, and the second substrate coupled between the first substrate and the third substrate and having formed therein the first cavity vertically penetrating a central portion thereof. The first cavity may be filled with a noble gas, and the first electrode and the second electrode, each formed in a comb-tooth shape, may face each other and be spaced apart from each other so that an area where the noble gas in the first cavity reacts with the electric field is evenly distributed.

A portion where the comb teeth of the first electrode and the comb teeth of the second electrode face each other may correspond to the region where the first cavity is formed in the second substrate.

The ultraviolet generating module may include the first substrate, the second substrate coupled to the lower surface of the first substrate and having a first electrode and a second electrode, wherein the first electrode and the second electrode are spaced apart while facing each other so as to form a first cavity having a serpentine shape and vertically penetrating the second substrate, and the third substrate coupled to the lower surface of the second substrate and having a first pad of the first electrode and a second pad of the second electrode on the lower surface thereof, a first via through which the first electrode is connected to the first pad of the first electrode, and a second via through which the second electrode is connected to the second pad of the second electrode. The first cavity may be filled with a noble gas, and the first electrode and the second electrode, each formed in a comb-tooth shape, may face each other and be spaced apart from each other so that the noble gas reacts with the electric field in an entire area of the first cavity.

The measuring module may include a support substrate spaced apart from the upper surface of the first substrate by a spacer and having a through hole having a serpentine shape and vertically penetrating therethrough so as to allow the gas ionized by ultraviolet to pass therethrough, and the third electrode and the fourth electrode spaced apart from each other and formed on the upper surface of the support substrate. Here, the gas ionized by ultraviolet may contact the third electrode or the fourth electrode due to the electric field formed by applying a voltage to the third electrode and the fourth electrode so as to generate an electrical signal.

The measuring module may further include a cover substrate coupled to the upper surface of the support substrate and having a second cavity in a central portion thereof so as to allow the gas passing through the through hole to be discharged therethrough, a third pad of the third electrode and a fourth pad of the fourth electrode on the upper surface thereof, a third via through which the third electrode and the third pad of the third electrode are connected, and a fourth via through which the fourth electrode and the fourth pad of the fourth electrode are connected.

The features and advantages of the present invention will be more clearly understood from the following detailed description taken in conjunction with the accompanying drawings.

It should be understood that the terms used in the specification and appended claims should not be construed as being limited to general and dictionary meanings, but should be construed based on meanings and concepts according to the spirit of the present invention on the basis of the principle that the inventor is permitted to define appropriate terms for the best explanation.

BRIEF DESCRIPTION OF THE DRAWINGS

The above and other objects, features, and other advantages of the present invention will be more clearly understood from the following detailed description taken in conjunction with the accompanying drawings, in which.

DETAILED DESCRIPTION OF THE INVENTION

Figure 1:
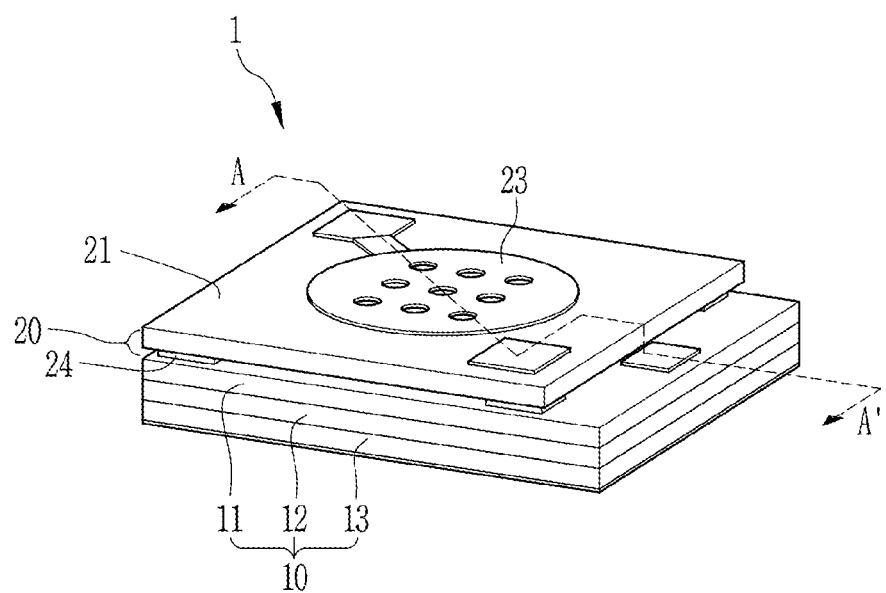
FIG. 1 is a perspective view of a photoionization gas sensor according to one embodiment of the present invention.

Objects, advantages, and features of the present invention will be apparent from the following detailed description of embodiments with reference to the accompanying drawings. It should be noted that, when reference numerals are assigned to the elements of the drawings, the same reference numeral is assigned to the same elements even when they are illustrated in different drawings. In addition, the terms "one surface", "the other surface", "first", "second", etc. are used to distinguish one element from another, and elements are not limited by the terms. In the following description of embodiments of the present invention, a detailed description of related known technology will be omitted when the same may obscure the subject matter of the embodiments of the present invention.

In addition, although terms indicating directions such as up, down, left, right, X-axis, Y-axis, and Z-axis are used in this specification, these terms are only for convenience of description, and it should be understood that it may be expressed differently depending on the position of the observer or the position of the object.

The terminology used in the description of the present application is merely for describing specific embodiments and is not intended to limit the embodiments. The singular forms are intended to also include the plural, unless the context clearly dictates otherwise.

Hereinafter, embodiments of the present invention will be described in detail with reference to the accompanying drawings.

Figure 2:
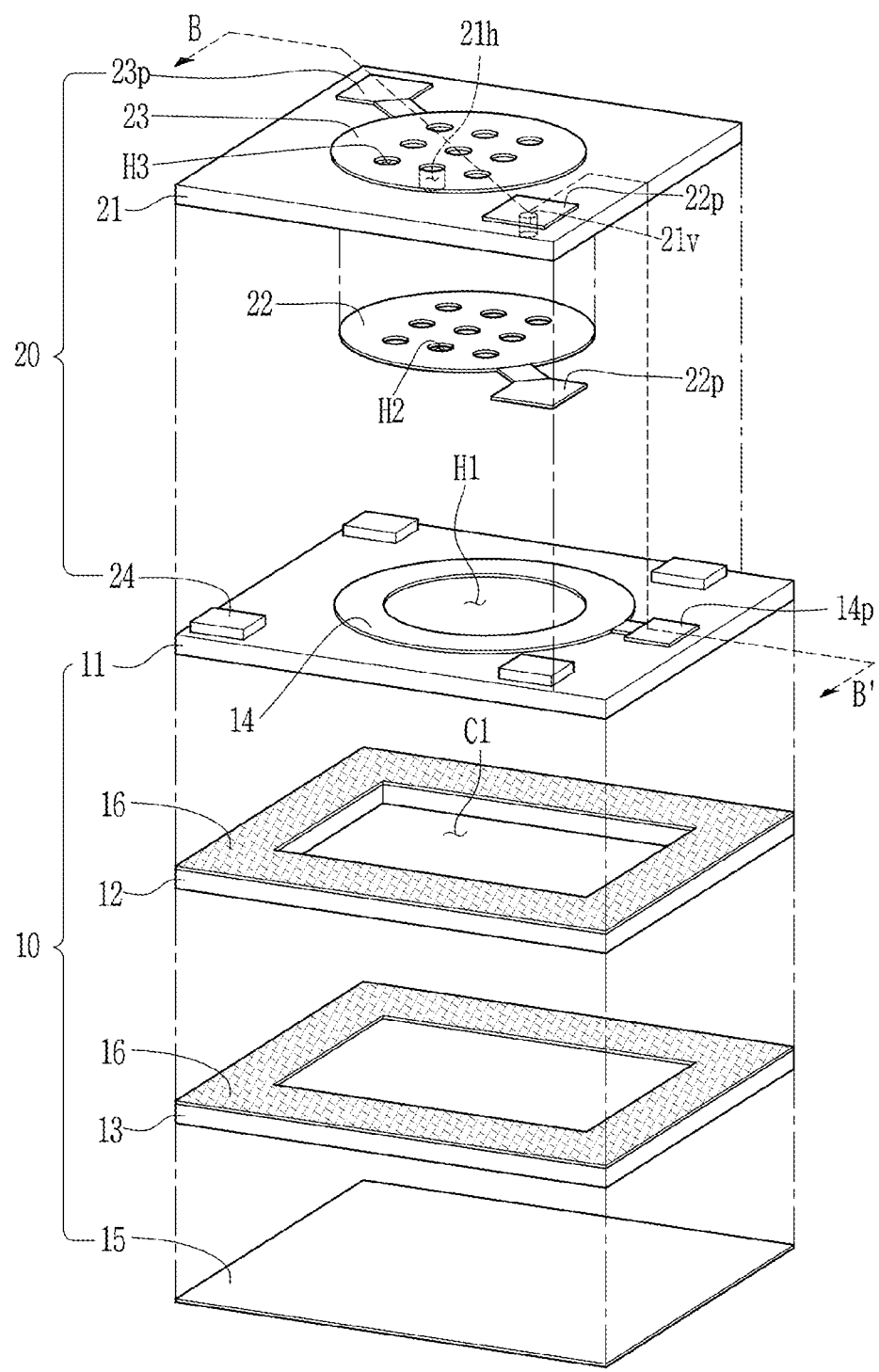
FIG. 2 is an exploded perspective view of the photoionization gas sensor according to the one embodiment of the present invention.
Figure 3:
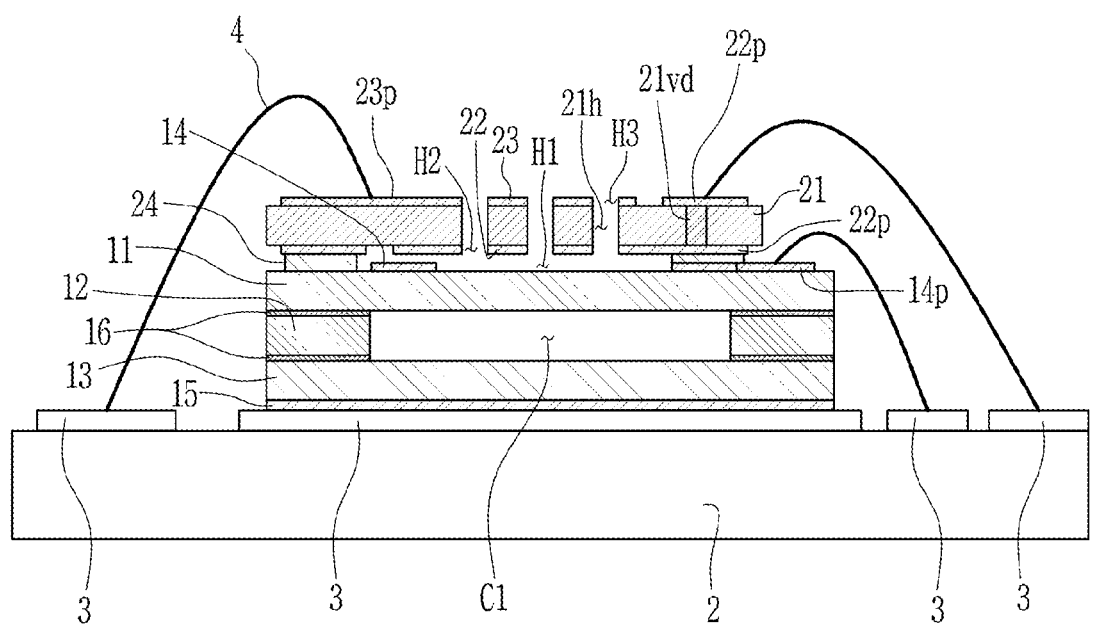
FIG. 3 is a sectional view taken along line A-A' of FIG. 1.

FIG. 1 is a perspective view of a photoionization gas sensor 1 according to one embodiment of the present invention. FIG. 2 is an exploded perspective view of the photoionization gas sensor 1 according to the one embodiment of the present invention. FIG. 3 is a sectional view taken along line A-A' of FIG. 1. Hereinafter, a description will be given with reference to FIGS. 1 to 3.

The photoionization gas sensor 1 according to the one embodiment of the present invention may include an ultraviolet generating module 10 having a first substrate 11, a second substrate 12, and a third substrate 13 sequentially coupled in a vertical direction, and configured to generate ultraviolet by applying an electric field to a noble gas which fills a first cavity C1, the first cavity C1 formed in a central portion of the second substrate 12, and a measuring module 20 configured to collect an electrical signal, the electrical signal generated such that an electric field is applied to a passage, through which gas ionized by ultraviolet passes, so as to allow the ionized gas to come into contact with an electrode.

In a conventional ultraviolet light source, a vacuum tube was filled with a noble gas, and electrodes were placed at opposite sides of the vacuum tube so as to apply thereto a high frequency high voltage of about 100 kHz and 1 kV. In addition, since electrodes were placed at opposite sides of the vacuum tube, a high voltage was needed so as to apply a strong electric field because the distance between the electrodes was large.

The ultraviolet generating module 10 according to the one embodiment of the present invention applies a strong electric field to the noble gas so that the noble gas emits ultraviolet. The ultraviolet generating module 10 is manufactured by a semiconductor manufacturing method and thus may have a very small size. The ultraviolet generating module 10 may be constructed such that the first substrate 11, the second substrate 12, and the third substrate 13 are coupled, and the second substrate 12 may be formed with the first cavity C1 capable of accommodating a noble gas. In other words, the first substrate 11, the second substrate 12 having formed therein the first cavity C1, and the third substrate 13 are coupled so as to form one chamber.

An electric field E may be expressed as voltage V/distance between electrodes d. That is, the smaller the distance d between electrodes, the higher the electric field E may be obtained with a lower voltage. In the ultraviolet generating module 10 according to the one embodiment of the present invention, the total height of the first substrate 11, the second substrate 12, and the third substrate 13 may correspond to the distance between the electrodes. Therefore, the distance between the electrodes may be minimized compared to the conventional vacuum tube, thereby generating ultraviolet with a low voltage.

The photoionization gas sensor 1 may be produced using a semiconductor manufacturing process or a micro-electro-mechanical systems (MEMS) manufacturing process. The ultraviolet generating module 10 may include a first substrate 11 having a first electrode 14 formed on an upper surface thereof, a third substrate 13 having a second electrode 15 formed on a lower surface thereof, and a second substrate 12 coupled between the first substrate 11 and the third substrate 13 and having formed therein the first cavity C1 vertically penetrating the central portion thereof.

The first substrate 11, the second substrate 12, and the third substrate 13 may be formed of silicon (Si). The first substrate 11 and the second substrate 12 may be coupled by an adhesive layer 16. The second substrate 12 and the third substrate 13 may be coupled by the adhesive layer 16. The adhesive layer 16 may be formed by various known techniques, such as an adhesive film, an adhesive, or the like.

The first cavity C1 in the second substrate 12 may be filled with a noble gas. The noble gas may include xenon (Xe), krypton (Kr), argon (Ar), and the like.

The first electrode 14 may form a first hole H1 in a central portion thereof, and the second electrode 15 may be formed in a plate shape. Ultraviolet generated by the reaction of the noble gas in the first cavity C1 with the electric field may be radiated upwardly of the first electrode 14 through the first hole H1 formed in the first electrode 14.

The first electrode 14 may be formed on the upper surface of the first substrate 11. The central portion of the first electrode 14 may form the first hole so as to allow ultraviolet to pass therethrough and to be directed to the measuring module 20. The second electrode may be formed in a plate shape on the lower surface of the third substrate 13. Since the second electrode 15 has a plate shape, and the first electrode 14 has formed therein the first hole H1, ultraviolet emitted from the noble gas accommodated in the first cavity C1 in the second substrate 12 may be emitted through the first hole H1 in the first electrode 14. The distance between the first electrode 14 and the second electrode 15 is smaller than the distance between the electrodes of the conventional vacuum tube-type ultraviolet light source. Therefore, ultraviolet may be generated with a relatively lower voltage.

At one end of the first electrode 14, a first pad 14$p$ may be formed. The first pad 14$p$ of the first electrode 14 may be connected to an external substrate 2. The first pad 14$p$ of the first electrode 15 may be connected to an external substrate 2. Referring to FIG. 3, the second electrode 15 may be connected to an electrode pad 3 of the external substrate 2 by direct contact or soldering. The first pad 14$p$ of the first electrode 14 may be connected to the electrode pad 3 of the external substrate 2 using a bonding wire 4. The external substrate 2 may supply a voltage for generating ultraviolet to the first electrode 14 and the second electrode 15.

The measuring module 20 may include a support substrate 21, a third electrode 22, and a fourth electrode 23. The support substrate 21 may be spaced apart from an upper surface of the first substrate 11 by a spacer 24, and may have formed therein a through hole 21$h$ vertically penetrating therethrough so as to allow the gas ionized by ultraviolet to pass therethrough. The support substrate 21 may be formed of silicon (Si). The spacer 24 may be coupled between the support substrate 21 and the first substrate 11. The support substrate 21 may be spaced apart from the upper surface of the first substrate 11 by the height of the spacer 24. The support substrate 21 may have formed therein the through hole 21$h$ so as to allow the ionized gas to flow from the lower surface to the upper surface of the support substrate 21. The through hole 21$h$ may be formed in plural. FIGS. 1 and 2 exemplarily illustrate the support substrate 21 formed with nine through holes 21$h$.

The third electrode 22 may be formed on the lower surface of the support substrate 21 and may be formed with a second hole H2 corresponding to the through hole 21$h$. The fourth electrode 23 may be formed on the upper surface of the support substrate 21 and may be formed with a third hole H3 corresponding to the through hole 21$h$. Due to the electric field formed by applying a voltage to the third electrode 22 and the fourth electrode 23, the gas ionized by ultraviolet may contact the third electrode 22 or the fourth electrode 23 so as to generate an electrical signal. The second hole H2, the through hole 21$h$, and the third hole H3 may be aligned in a line so as to form a single passage through which the gas passes.

The third electrode 22 and the fourth electrode 23 may be formed of an electrically conductive material, for example, a metal such as copper (Cu), aluminum (Al), silver (Ag), or an alloy including the same. The third electrode 22 may be formed in a circular shape and be placed on the lower surface of the support substrate 21. At one end of the third electrode 22, a third pad 22$p$ may be formed. The third pad 22$p$ of the third electrode 22 may be formed on a corner edge of the support substrate 21. The fourth electrode 23 may be formed in a circular shape and be placed on the upper surface of the support substrate 21. At one end of the fourth electrode 23, a fourth pad 23$p$ may be formed. The fourth pad 23$p$ formed on the upper surface of the support substrate 21 may be connected to the fourth electrode 23, and the third pad 22$p$ formed on the upper surface of the support substrate 21 may be connected to the third pad 22$p$ formed on the lower surface of the support substrate 21 through a via 21$v$ in the support substrate 21. The via 21$v$ may be vertically formed through the support substrate 21 so as to transmit an electrical signal.

The third pad 22$p$ formed on the upper surface of the support substrate 21 may be connected to the electrode pad 3 of the external substrate 2 via the bonding wire 4. The fourth pad 23$p$ of the fourth electrode 23 may be connected to the electrode pad 3 of the external substrate 2 via the bonding wire 4. The external substrate 2 may supply a voltage to the third electrode 22 and the fourth electrode 23 so as to acquire an electrical signal generated when the ionized gas contacts the third electrode 22 or the fourth electrode 23.

In the photoionization gas sensor 1 illustrated in FIGS. 1 to 3, gas may flow into a space between the support substrate 21 and the first substrate 11. The gas may be ionized by ultraviolet while passing through the first hole H1 in the first electrode 14. The ionized gas may pass through the through hole 21$h$ in the support substrate 21. Here, due to the electric field formed by the third electrode 22 formed on the lower surface of the support substrate 21 and the fourth electrode 23 formed on the upper surface of the support substrate 21, the ionized gas may move depending on the polarity and contact the third electrode 22 or the fourth electrode 23 so as to generate an electrical signal.

Figure 4:
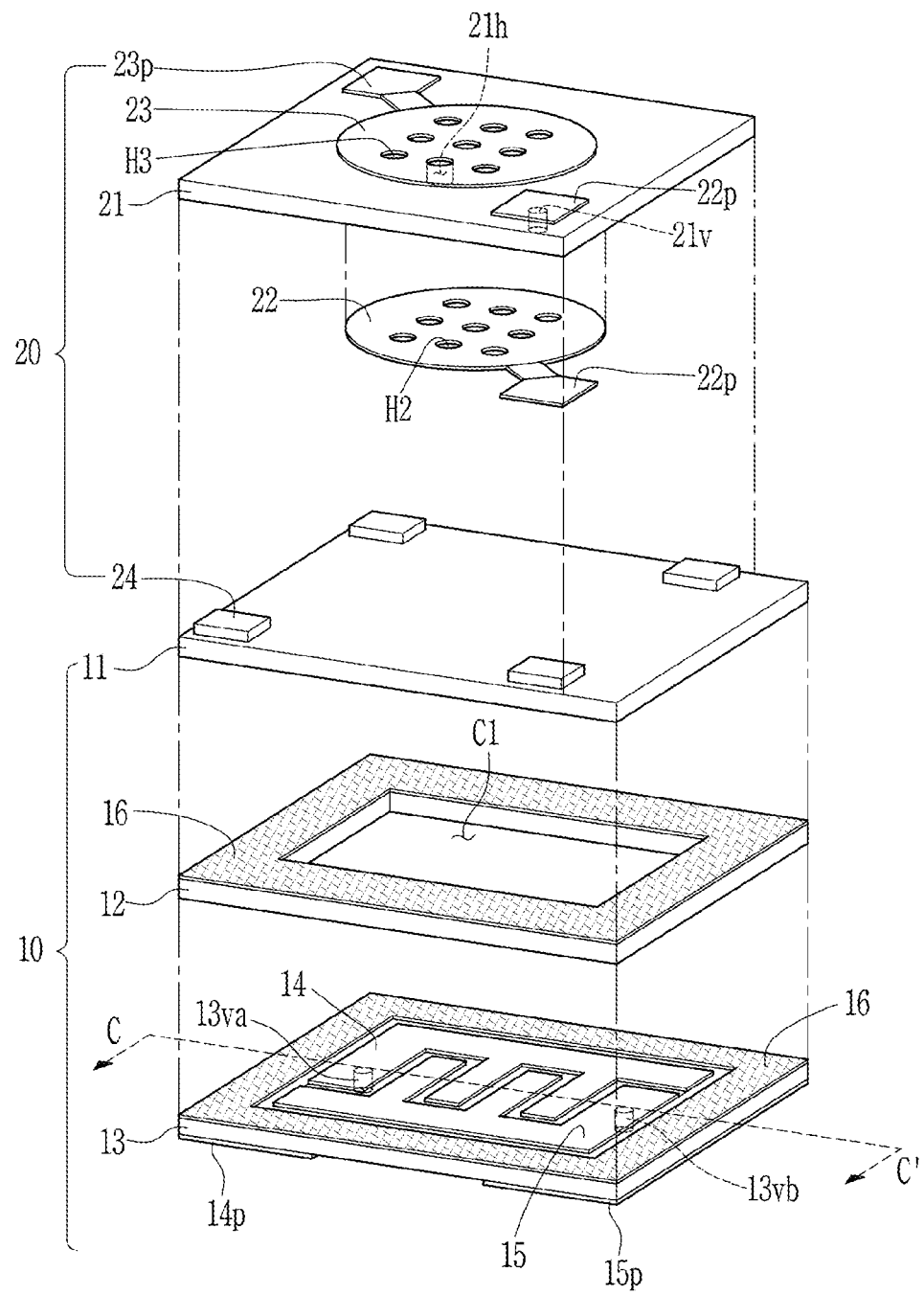
FIG. 4 is a perspective view of a photoionization gas sensor according to a different embodiment of the present invention.
Figure 5:
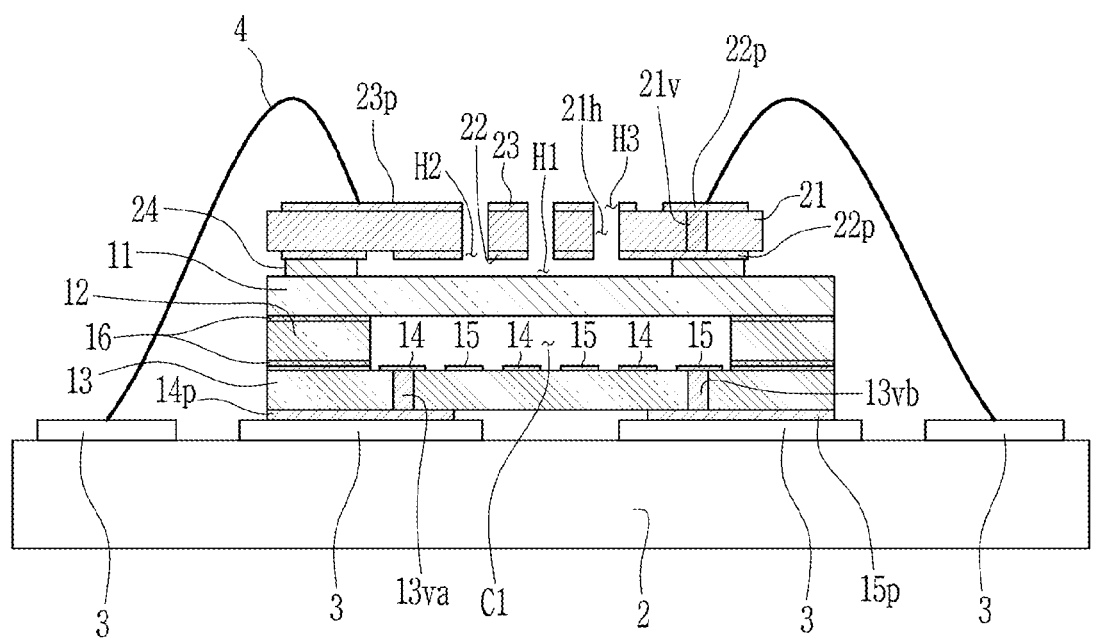
FIG. 5 is a sectional view taken along lines B-B' and C-C' of FIG. 4.

FIG. 4 is a perspective view of a photoionization gas sensor 1 according to a different embodiment of the present invention. FIG. 5 is a sectional view taken along lines B-B' and C-C' of FIG. 4. Hereinafter, a description will be given with reference to FIGS. 4 and 5.

FIGS. 4 and 5 illustrate the different embodiment of the present invention. The structure of the ultraviolet generating module 10 in FIGS. 4 and 5 is partially different from the structure of the ultraviolet generating module 10 illustrated in FIGS. 1, 2, and 3.

The ultraviolet generating module 10 according to the different embodiment of the present invention may include the first substrate 11, the third substrate 13 having the first electrode 14 and the second electrode 15 spaced apart from each other on an upper surface thereof, and the second substrate 12 coupled between the first substrate 11 and the third substrate 13 and having formed therein the first cavity C1 vertically penetrating the central portion thereof. The structure in which the first substrate 11, the second substrate 12, and the third substrate 13 are sequentially coupled in a vertical direction, and a noble gas fills the first cavity C1 formed in the second substrate 12 is the same as the structure described in FIGS. 1 to 3.

In the ultraviolet generating module 10 according to the different embodiment of the present invention, the first electrode 14 and the second electrode 15 are formed on the upper surface of the third substrate 13. Since the first electrode 14 and the second electrode 15, each formed in a comb-tooth shape, face each other and are spaced apart from each other so as to form the first cavity C1 therebetween, an area where the noble gas in the first cavity C1 reacts with the electric field may be evenly distributed. Since the first electrode 14 and the second electrode 15 are formed in parallel on the upper surface of the third substrate 13, the distance therebetween is small. Therefore, a lower voltage may be used to generate ultraviolet. A portion where the comb teeth of the first electrode 14 and the comb teeth of the second electrode 15 face each other may correspond to the region where the first cavity C1 is formed in the second substrate 12. When the number of comb teeth of the first electrode 14 and the number of comb teeth of the second electrode 15 are increased, the contact area between the noble gas and the electric field increases, thereby increasing efficiency in generating ultraviolet.

On the lower surface of the third substrate 13, a first pad 14p of the first electrode 14 and a second pad 15p of the second electrode 15 may be formed to be spaced apart from each other. The third substrate 13 may have a first via 13va and a second via 13vb vertically formed therethrough. The first electrode 14 may be connected to the first pad 14p through the first via 13va in the third substrate 13. The second electrode 15 may be connected to the second pad 15p through the second via 13vb in the third substrate 13.

The first pad 14p of the first electrode 14 may be directly connected to the electrode pad 3 of the external substrate 2 or may be connected to the electrode pad 3 of the external substrate 2 by soldering. The second pad 15p of the second electrode 15 may be directly connected to the electrode pad 3 of the external substrate 2 or may be connected to the electrode pad 3 of the external substrate 2 by soldering.

Figure 6:
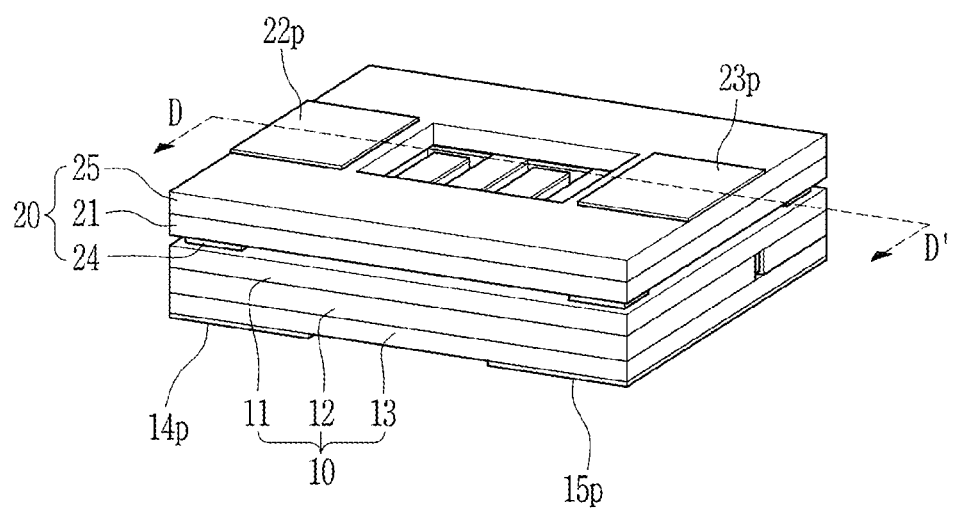
FIG. 6 is a perspective view of a photoionization gas sensor according to a further embodiment of the present invention.
Figure 7:
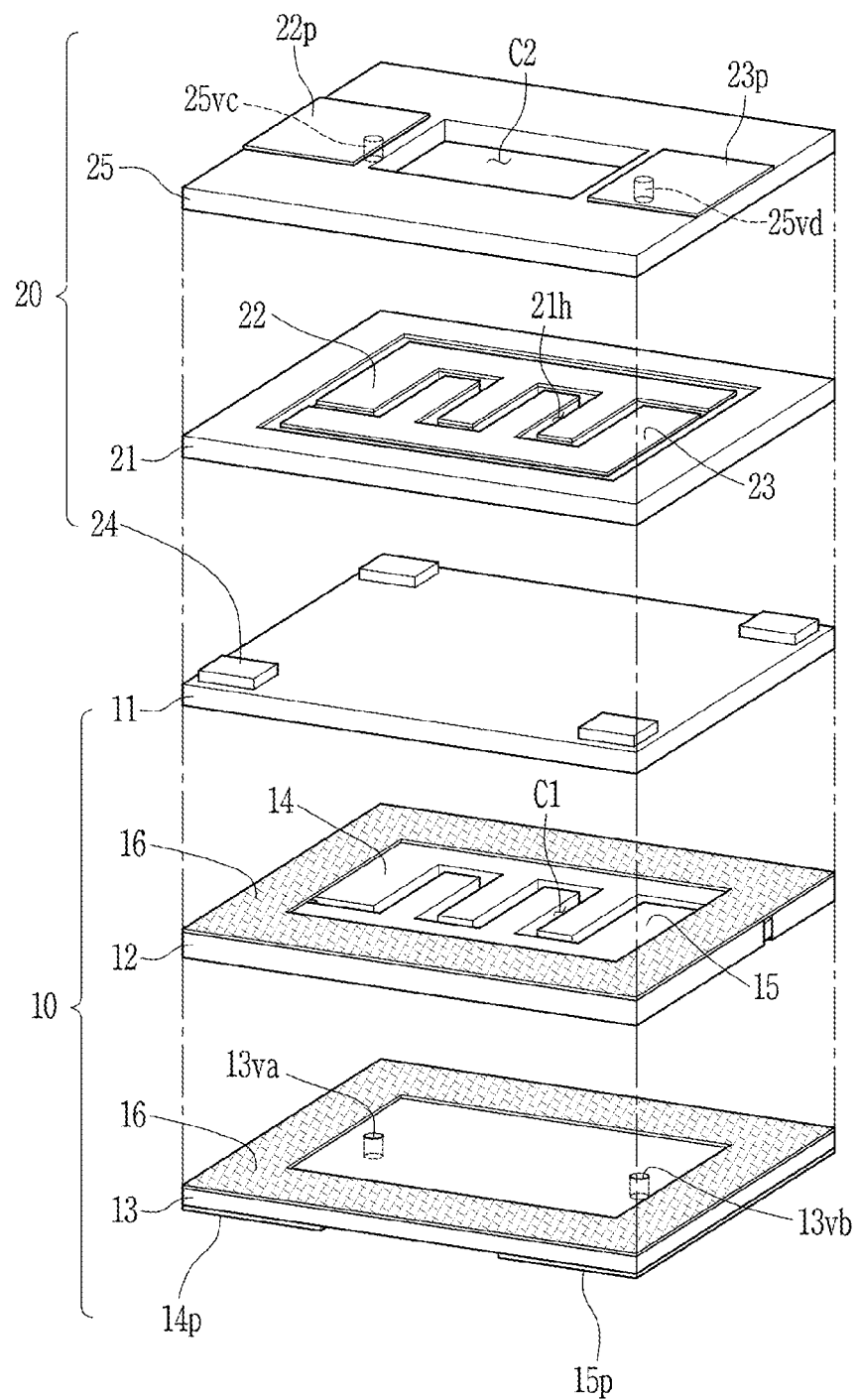
FIG. 7 is an exploded perspective view of the photoionization gas sensor according to the further embodiment of the present invention.
Figure 8:
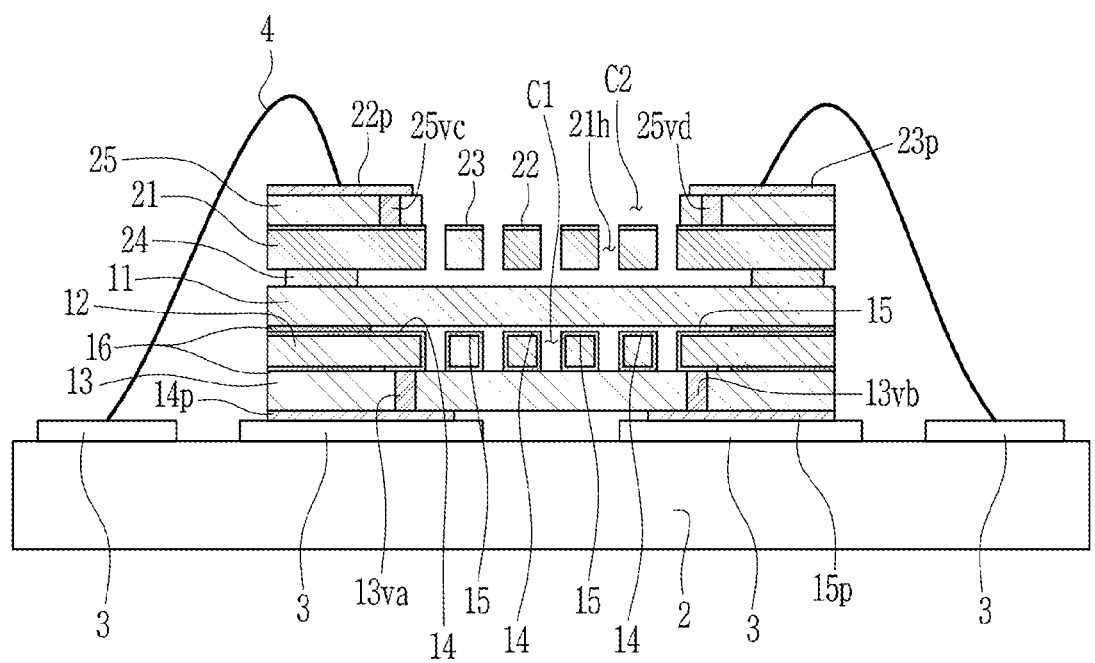
FIG. 8 is a sectional view taken along line D-D' of FIG. 6.

FIG. 6 is a perspective view of the photoionization gas sensor 1 according to the further embodiment of the present invention. FIG. 7 is an exploded perspective view of the photoionization gas sensor 1 according to the further embodiment of the present invention. FIG. 8 is a sectional view taken along line D-D' of FIG. 6. Hereinafter, a description will be given with reference to FIGS. 6 to 8.

The structure of the ultraviolet generating module 10 and the structure of the measuring module 20 in the photoionization gas sensor 1 according to the further embodiment of the present invention are different from the same in the photoionization gas sensor 1 according to the above described embodiments.

The ultraviolet generating module 10 may include the first substrate 11, the second substrate 12, and the third substrate 13. The second substrate 12 may be coupled to the lower surface of the first substrate 11. The second substrate 12 may have the first electrode 14 and the second electrode 15, wherein the first electrode 14 and the second electrode 15 may be spaced apart while facing each other so as to form the first cavity C1 having a serpentine shape and vertically penetrating the second substrate 12. The third substrate 13 may be coupled to the lower surface of the second substrate 12. The third substrate 13 may have the first pad 14p of the first electrode 14 and the second pad 15p of the second electrode 15 on the lower surface thereof. The third substrate 13 may also have the first via 13va through which the first electrode 14 is connected to the first pad 14p of the first electrode 14, and the second via 13vb through which the second electrode 15 is connected to the second pad 15p of the second electrode 15.

In the central portion of the second substrate 12, the first cavity C1 having a serpentine shape may be formed. The serpentine shape of the first cavity C1 may be formed by the comb teeth of the first electrode 14 and the comb teeth of the second electrode 15 facing each other. The first electrode 14 and the second electrode 15 may be formed over the upper surface, the lower surface, and the inner surface of the second substrate 12. The first electrode 14 and the second electrode 15 may be formed to be spaced apart from each other on the upper surface, the lower surface, and the inner surface of the second substrate 12. A noble gas fills a space between the first electrode 14 and the second electrode 15. When a voltage is applied to the first electrode 14 and the second electrode 15, an electric field is applied to the noble gas so as to generate ultraviolet. Since the first electrode 14 and the second electrode 15, each formed in a comb-tooth shape, face each other and are spaced apart from each other, the noble gas may react with the electric field in the entire area of the first cavity C1. Therefore, the electric field generated by the first electrode 14 and the second electrode 15 is entirely applied to the noble gas, thereby increasing efficiency and the amount of ultraviolet.

On the lower surface of the third substrate 13, the first pad 14p of the first electrode 14 and the second pad 15p of the second electrode 15 may be formed. The first pad 14p of the first electrode 14 may be connected to the first electrode 14 formed on the lower surface of the second substrate 12 through the first via 13va in the third substrate 13. The second pad 15p of the second electrode 15 may be connected to the second electrode formed on the lower surface of the second substrate 12 through the second via 13vb in the third substrate 13. The first pad 14p of the first electrode 14 and the second pad 15p of the second electrode 15 formed on the lower surface of the third substrate 13 may be connected to an electrode pattern of the external substrate 2.

The measuring module 20 may include the support substrate 21 spaced apart from the upper surface of the first substrate 11 by the spacer 24 and having the through hole 21h having a serpentine shape and vertically penetrating therethrough so as to allow the gas ionized by ultraviolet to pass therethrough, and the third electrode 22 and the fourth electrode 23 spaced apart from each other and formed on the upper surface of the support substrate 21. Due to the electric field formed by applying a voltage to the third electrode 22 and the fourth electrode 23, the gas ionized by ultraviolet may contact the third electrode 22 or the fourth electrode 23 so as to generate an electrical signal.

As described above, the support substrate 21 of the measuring module 20 is spaced apart from the first substrate 11 by the spacer 24. The serpentine-shaped through hole 21h may be formed in the support substrate 21. The serpentine-shaped through hole 21h may have a shape in which toothed portions of two combs face each other. The third electrode 22 and the fourth electrode 23 may be formed on the upper surface of the support frame 21. The third electrode 22 and the fourth electrode 23, each of which has a comb shape, may be disposed such that toothed portions of two combs face each other and are spaced apart from each other.

The gas ionized by ultraviolet passes through the serpentine-shaped through hole 21h and passes through a space in which the third electrode 22 and the fourth electrode 23 face each other to form an electric field. The ionized gas may contact the third electrode 22 or the fourth electrode 23 depending on the electric field so as to generate an electrical signal. Compared with the structure illustrated in FIGS. 1 to 5, in which a plurality of circular through-holes 21h is formed in the support substrate 21 and the third electrode 22 and the fourth electrode 23 are disposed on the upper surface and the lower surface of the support substrate 21, respectively, the structure illustrated in FIGS. 6 to 8, in which the third electrode 22 and the fourth electrode 23 are formed on the same plane, which is the upper surface of the support substrate 21, has a smaller distance between the electrodes and forms a stronger electric field, thereby increasing measurement sensitivity.

The measuring module 20 may further include a cover substrate 25 coupled to the upper surface of the support substrate 21 and having a second cavity C2 in the central portion thereof so as to allow the gas passing through the through hole 21h to be discharged therethrough, the third pad 22p of the third electrode 22 and the fourth pad 23p of the fourth electrode 23 on the upper surface thereof, a third via 25vc through which the third electrode 22 and the third pad 22p of the third electrode 22 are connected, and a fourth via 25vd through which the fourth electrode 23 and the fourth pad 23p of the fourth electrode 23 are connected.

The bonding wire 4 may not be directly formed on the support substrate 21 but may be used to connect the cover substrate 25 to the electrode pad 3. The second cavity C2 having a size sufficient to surround the serpentine-shaped through hole 21h, formed in the support substrate 21, may be formed in the center of the cover substrate 25. It may be better that the second cavity C2 in the cover substrate 25 is formed larger than the through hole 21h in the support substrate 21 so that the gas passing through the support substrate 21 flows through the second cavity C2. On the upper surface of the cover substrate 25, the third pad 22p of the third electrode 22 and the fourth pad 23p of the fourth electrode 23 may be formed. The cover substrate 25 may have the third via 25vc and the fourth via 25vd vertically passing therethrough. The third pad 22p of the third electrode 22 may be connected to the third electrode 22 through the third via 25vc in the cover substrate 25. The fourth pad 23p of the fourth electrode 23 may be connected to the third electrode 22 through the fourth via 25vd in the cover substrate 25. The third pad 22p of the third electrode 22 may be connected to the electrode pad 3 of the external substrate 4 via the bonding wire 4. The fourth pad 23p of the fourth electrode 23 may be connected to the electrode pad 3 of the external substrate 4 via the bonding wire 4.

According to the embodiments of the present invention described above, when the distance between the first electrode 14 and the second electrode 15 of the ultraviolet generating module 10 is minimized and the area where the electric field formed by the first electrode 14 and the second electrode 15 and the noble gas react is maximized, a large amount of ultraviolet may be generated with a low voltage. In addition, when the area of the electric field generated by the third electrode 22 and the fourth electrode 23 of the measuring module 20 is maximized and the distance between the third electrode 22 and the fourth electrode 23 is minimized, the ionized gas may be measured with high sensitivity.

As is apparent from the above description, according to the embodiment of the present invention, an ultraviolet light source having a structure that maximizes an electric field in contact with a noble gas and minimizes a gap between electrodes is used so that a photoionization gas sensor may have a small volume and be operated at a low voltage.

Although the present invention has been described in detail with reference to the embodiments, the embodiments are provided to describe the present invention in detail, the present invention is not limited thereto, and the present invention can be modified or improved by a person having ordinary skill in the art to which the preset invention pertains within the technical idea of the invention.

Simple modifications and changes of the present invention are to be appreciated as being included within the scope and spirit of the invention, and the protection scope of the present invention will be defined by the accompanying claims.

What is claimed is:

1. A photoionization gas sensor comprising:
an ultraviolet generating module having a first substrate, a second substrate, and a third substrate sequentially coupled in a vertical direction, having a first electrode and a second electrode that generate a first electric field, and configured to generate ultraviolet by applying the first electric field to a noble gas filling a first cavity, the first cavity formed in a first central portion of the second substrate; and
a measuring module configured to collect an electrical signal, the electrical signal being generated such that a second electric field is applied to a passage, through which gas ionized by ultraviolet passes, so as to allow the gas ionized by ultraviolet to come into contact with a plurality of electrodes,
wherein the measuring module comprises:
a support substrate spaced apart from the upper surface of the first substrate by a spacer and having a through hole vertically penetrating therethrough so as to allow the gas ionized by ultraviolet to pass therethrough;
a third electrode, among of the plurality of electrodes, formed on a lower surface of the support substrate and formed with a first hole corresponding to the through hole; and
a forth electrode, among of the plurality of electrodes, formed on an upper surface of the support substrate and formed with a second hole corresponding to the through hole,
wherein the gas ionized by ultraviolet contacts the third electrode or the forth electrode due to the second electric field formed by applying a voltage to the third electrode and the forth electrode so as to generate the electrical signal, and
wherein the gas ionized by ultraviolet is gas that flows into a space between the support substrate and the first substrate.

2. The photoionization gas sensor according to claim 1, wherein the ultraviolet generating module comprises:
the first substrate having the first electrode formed on an upper surface thereof;
the third substrate having the second electrode formed on a lower surface thereof; and
the second substrate coupled between the first substrate and the third substrate and having formed therein the first cavity vertically penetrating the first central portion thereof,
wherein the first cavity is filled with a noble gas, and
wherein the first electrode forms a third hole in a second central portion thereof and the second electrode is formed in a plate shape so as to radiate ultraviolet, generated by a reaction of the noble gas in the first cavity with the first electric field, upwardly of the first electrode through the third hole.

3. The photoionization gas sensor according to claim 1, wherein the ultraviolet generating module comprises:
the first substrate;
the third substrate having the first electrode and the second electrode spaced apart from each other on an upper surface thereof; and
the second substrate coupled between the first substrate and the third substrate and having formed therein the first cavity vertically penetrating the first central portion thereof,
wherein the first cavity is filled with a noble gas, and
wherein the first electrode and the second electrode, each formed in a comb-tooth shape, face each other and are spaced apart from each other so that an area where the noble gas in the first cavity reacts with the first electric field is evenly distributed.

4. The photoionization gas sensor according to claim 3, wherein a portion where the comb teeth of the first electrode and the comb teeth of the second electrode face each other may correspond to the region where the first cavity is formed in the second substrate.

5. The photoionization gas sensor according to claim 1, wherein the ultraviolet generating module comprises:
the first substrate;
the second substrate coupled to the lower surface of the first substrate, and having the first electrode and the second electrode, wherein the first electrode and the second electrode are spaced apart while facing each other so as to form the first cavity having a serpentine shape and vertically penetrating the second substrate; and
the third substrate coupled to the lower surface of the second substrate, and having a first pad of the first electrode and a second pad of the second electrode on the lower surface thereof, a first via through which the first electrode is connected to the first pad of the first electrode, and a second via through which the second electrode is connected to the second pad of the second electrode,
wherein the first cavity is filled with a noble gas, and
wherein the first electrode and the second electrode, each formed in a comb-tooth shape, face each other and are spaced apart from each other so that the noble gas reacts with the first electric field in an entire area of the first cavity.

6. The photoionization gas sensor according to claim 1, wherein the through hole has a serpentine shape.

7. A photoionization gas sensor comprising:
an ultraviolet generating module having a first substrate, a second substrate, and a third substrate sequentially coupled in a vertical direction, and having a first electrode and a second electrode that generate a first electric field, and configured to generate ultraviolet by applying the first electric field to a noble gas filling a first cavity, the first cavity formed in a first central portion of the second substrate;
a measuring module comprising a support substrate spaced apart from the upper surface of the first substrate by a spacer and having a through hole has having a serpentine shape and vertically penetrating therethrough so as to allow gas ionized by ultraviolet to pass therethrough, and a third electrode and a fourth electrode spaced apart from each other and formed on the upper surface of the support substrate; and
a cover substrate coupled to the upper surface of the support substrate and having a second cavity in a second central portion thereof so as to allow the gas passing through the through hole to be discharged therethrough, a first pad of the third electrode and a second pad of the fourth electrode on the upper surface thereof, a first via through which the third electrode and the first pad of the third electrode are connected, and a second via through which the fourth electrode and the second pad of the fourth electrode are connected,
wherein the gas ionized by ultraviolet is gas that flows into a space between the support substrate and the first substrate, and
wherein the measuring module configured to collect an electrical signal, the electrical signal being generated such that a second electric field is applied to the through hole, so as to allow the gas ionized by ultraviolet to come into contact with a third electrode and a fourth electrode.

* * * * *